(12) United States Patent
Hsiao

(10) Patent No.: US 8,208,089 B2
(45) Date of Patent: Jun. 26, 2012

(54) LIQUID CRYSTAL DISPLAY WITH FASTEN STRUCTURE

(75) Inventor: Chih-Chung Hsiao, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 679 days.

(21) Appl. No.: 12/381,277

(22) Filed: Mar. 9, 2009

(65) Prior Publication Data
US 2009/0225255 A1 Sep. 10, 2009

(30) Foreign Application Priority Data

Mar. 7, 2008 (TW) .............................. 97108060 A (51) Int. Cl.
*G02F 1/1333* (2006.01)
(52) U.S. Cl. ........................................................ 349/58
(58) Field of Classification Search ....................... 349/58
See application file for complete search history.

(56) References Cited

U.S. PATENT DOCUMENTS

| 6,522,372 | B2 | 2/2003 | Yang | |
|---|---|---|---|---|
| 7,924,360 | B2* | 4/2011 | Cheng et al. | 349/58 |
| 2007/0040958 | A1* | 2/2007 | Choi et al. | 349/58 |
| 2007/0273809 | A1* | 11/2007 | Lee | 349/58 |

FOREIGN PATENT DOCUMENTS

CN 1228667 C 11/2005
* cited by examiner

*Primary Examiner* — Timothy L Rude
(74) *Attorney, Agent, or Firm* — WPAT., P.C.; Justin King (57) ABSTRACT

A present liquid crystal display includes three frames, two side fasten trellises, and a plurality of tenons used to fasten the three frames and the two side fasten trellises. Each frame has a plurality of clips. The clips of at least one frame have at least one fasten component. Each side fasten trellis has grooves and second fasten portions. The tenons snap into the grooves and conjunct with the clips to assemble the three frames and the side fasten trellises, the fasten component coordinates with the second fasten portion.

20 Claims, 7 Drawing Sheets

LIQUID CRYSTAL DISPLAY WITH FASTEN STRUCTURE

CROSS-REFERENCE TO RELATED APPLICATION

This application is related to, and claims the benefit of, a foreign priority application filed in Taiwan as Serial No. 097108060 on Mar. 7, 2008. The related application is incorporated herein by reference.

FIELD OF THE DISCLOSURE

The present disclosure relates to a liquid crystal display (LCD) with a fasten structure.

GENERAL BACKGROUND

Liquid crystal displays that are light and thin and have low power consumption characteristics have been widely used in office automation equipment, video units, and the like.

A direct-backlight type liquid crystal display usually has a plurality of lamps, a plurality of optics films, a liquid crystal display panel, and a plurality of frames used to assemble all of above. Therefore, the liquid crystal display needs a plurality of screws to fasten the frames. However, it takes a lot of time to assemble the liquid crystal display with the screws.

What is needed, therefore, is an LCD that can overcome the described limitations, as well as a direct-backlight liquid crystal display employing the backlight module.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF DISCLOSURE

Reference will now be made to the drawings to describe preferred and exemplary embodiments in detail.

Figure 1:
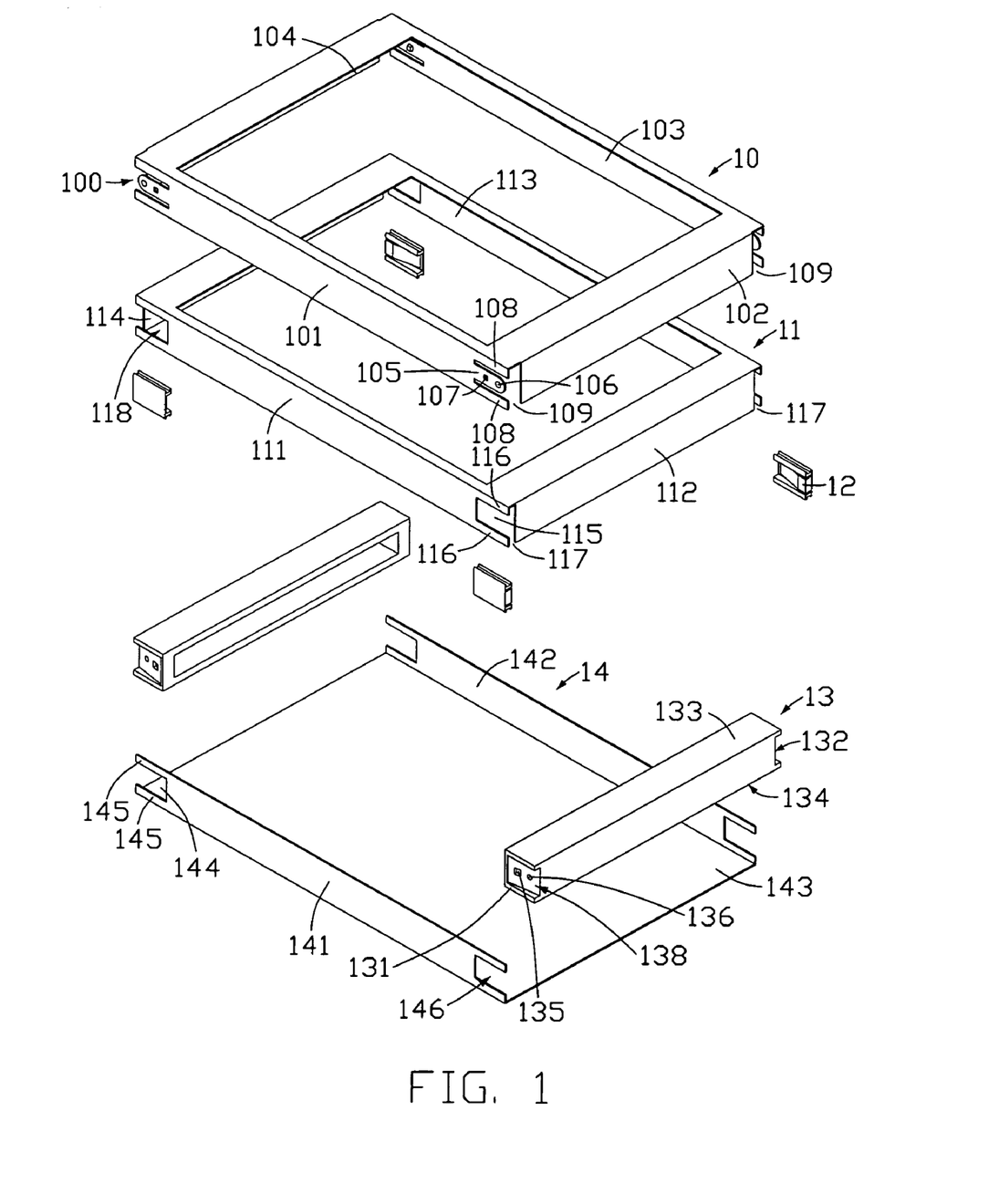
FIG. 1 shows an exploded, isometric view of a liquid crystal display according to a first embodiment of the present disclosure, the LCD including a plurality of tenons.

Referring to FIG. 1, a liquid crystal display 1 includes a first frame 10, a second frame 11, a plurality of tenons 12, two side fasten trellises 13, a third frame 14, a liquid crystal display panel (not shown), a plurality of optical films (not shown), and a plurality of lamps (not shown).

The third frame 14 includes a bottom plate 143, a first side wall 141, and a second side wall 142. The first side wall 141 and the second side wall 142 have a same structure. The first side wall 141 and the second side wall 142 are disposed vertically, and face to each other in parallel. The first side wall 141 has two ends. Each end of the first side wall 141 forms a first clip 146. The two first clips 146 are disposed at two edges of the first side wall 141. The first clip 146 has a rectangular opening 144, and two chips 145 as the edges of the rectangular opening 144. The rectangular opening 144 and two chips 145 make a "[" shape.

Each of the side fasten trellises 13 has a cubic shape used to fasten the plurality of lamps and avoids light leakage from lamps. The two side fasten trellises 13 are disposed between the first side wall 141 and the second side wall 142 with four ends adjoining the four first clips 146. The two side fasten trellises 13 are arranged opposite to each other. Each side fasten trellis 13 includes a first side surface 131, a second side surface 132, a top surface 133, and a bottom surface 134. The first side surface 131 and the second surface 132 are disposed between the top surface 133 and the bottom surface 134. The first side surface 131 and the second side surface 132 have a same structure. Each of the first side surface 131 and the second side surface 132 has a cuneiform groove 138. The two cuneiform grooves 138 correspond to the two openings 144, respectively. The bottom surface 134 is disposed on the bottom plate 143.

A bottom surface of the cuneiform groove 138 is a slant. The depth of the cuneiform groove 138 decreases along the concaving direction of the opening 144. A rectangular fixing portion 135 and a circular fixing portion 136 are disposed on the bottom surface of the cuneiform groove 138. The rectangular fixing portion 135 and the circular fixing portion 136 are arranged corresponding to an incline of the cuneiform groove 138.

The second frame 11 includes a shell (not labeled), a third side wall 111, a fourth side wall 112, a fifth side wall 113, and a sixth side wall 114. The third side wall 111, the fourth side wall 112, the fifth side wall 113, and the sixth side wall 114 extend perpendicularly from the edges of the shell. The third side wall 111, the fourth side wall 112, the fifth side wall 113, and the sixth side wall 114 are separate from each other with a first gap 117 formed between two ends of each two adjacent side walls. The third side wall 111 and the fifth side wall 113 are arranged opposite to each other and have a same structure. The fourth side wall 112 and the sixth side wall 114 are arranged opposite to each other and have a same structure. The third side wall 111 corresponds to the first side wall 141 of the third frame 14. Each end of the third side wall 111 forms a second clip 118 having a "[" shape substantially the same as that of each first clip 146. Each second clip 118 has a rectangular opening 115 and two chips 116. The rectangular opening 115 of the second clip 118 has the same shape and size as that of the rectangular opening 144 of the corresponding first clip 146.

The first frame 10 includes a rectangular display opening (not labeled), a shell (not labeled) for forming the rectangular display opening, a seventh side wall 101, an eighth side wall 102, a ninth side wall 103, and a tenth side wall 104. The seventh side wall 101, the eighth side wall 102, the ninth side wall 103, and the tenth side wall 104 extend perpendicularly from the edges of the shell. The seventh side wall 101, the eighth side wall 102, the ninth side wall 103, and the tenth side wall 104 are separate from each other with a second gap 109 formed between two ends of each two adjacent side walls. The second gaps 109 are disposed corresponding to the first gaps 117. The seventh side wall 101 and the ninth side wall 103 are arranged opposite to each other and have a same structure. The eighth side wall 102 and the tenth side wall 104 are arranged opposite to each other and have a same structure. Each end of the seventh side wall 101 forms a third clip 100 having a "[" shape as that of the first clip 146. Each third clip 100 has a rectangular opening (not labeled) and two chips 108. The rectangular opening of the third clip 100 has the same shape and size as the rectangular opening 144 of the first clip 146.

Figure 3:
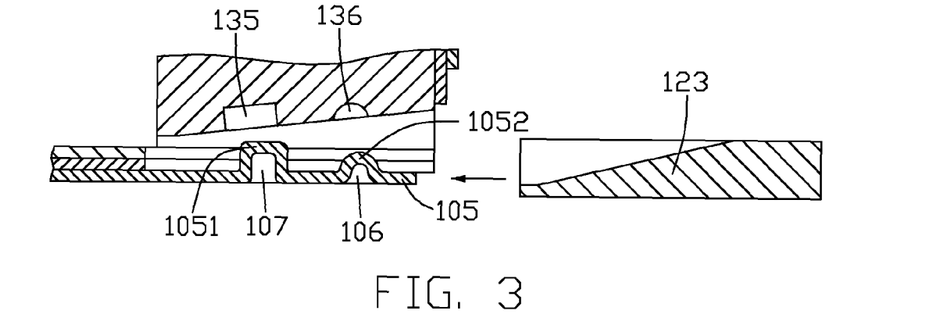
FIG. 3 shows a cross-sectional view of a to-be-assembled tenon of FIG. 1.
Figure 4:
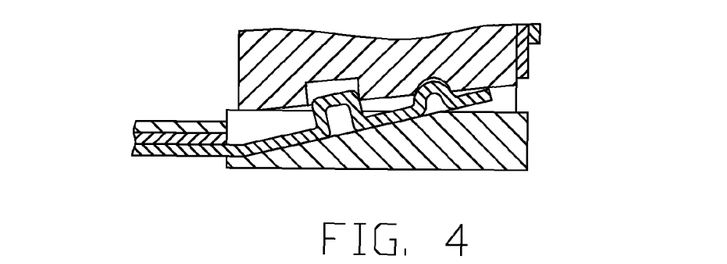
FIG. 4 shows a cross-sectional view of an assembled tenon of FIG. 1.
Figure 5:
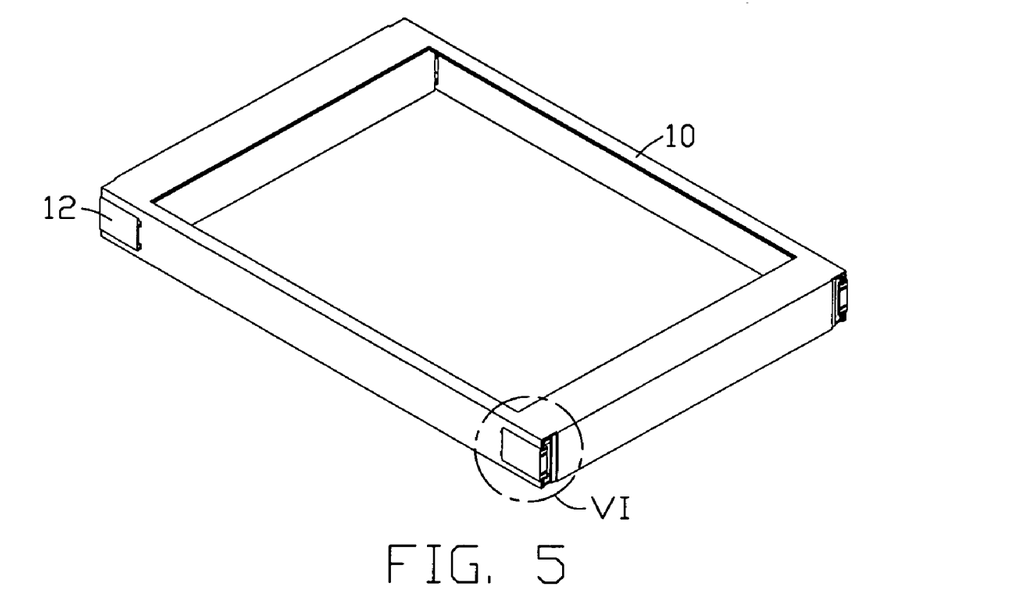
FIG. 5 shows an isometric view of the assembled liquid crystal display of FIG. 1.
Figure 6:
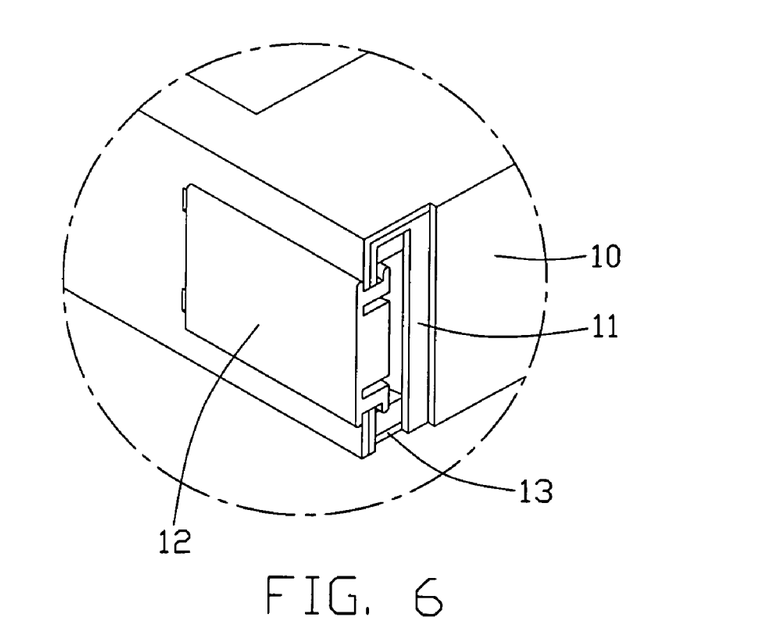
FIG. 6 shows an enlarged view of a circuled portion VI of FIG. 5.

A plurality of fasten components are disposed on the third clips 100. Each fasten component is a flexible plate 105, which extends in the rectangular opening of a corresponding third clip 100. The flexible plate 105 is between the two chips 108. Referring also to FIG. 3, the flexible plate 105 has a rectangular first fixing portion 1051 and a circular first fixing portion 1052 on one side. The rectangular first fixing portion 1051 is a protrusion. The shape and the size of the rectangular first fixing portion 1051 correspond to the rectangular fixing portion 135 of the cuneiform groove 138. The circular first fixing portion 1052 is a protrusion. The shape and the size of the circular first fixing portion 1052 correspond to the circular fixing portion 136 of the respective cuneiform groove 138. The rectangular first fixing portion 1051 and the circular first fixing portion 1052 are formed by stamping, so a rectangular groove 107 and a circular groove 106 are formed in the outside of the flexible plate 105 when stamping the rectangular first fixing portion 1051 and the circular first fixing portion 1052.

Figure 2:
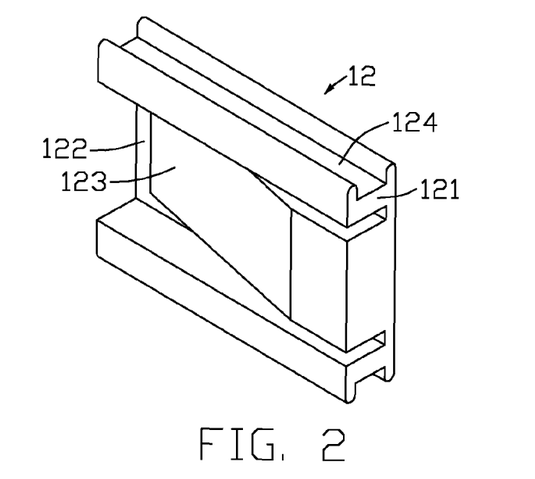
FIG. 2 shows an enlarged view of one of the tenons of FIG. 1.

Referring to FIG. 2, each tenon 12 includes a base 122, two side walls 121 extending vertically from two edges of the base 122 respectively, and a protrusion 123. The two side walls 121 are parallel to each other and have a same structure. The protrusion 123 is disposed on the base 122 between the two side walls 121. The protrusion 123 has a trapeziform shape. A slant angle of the protrusion 123 corresponds to the slant angle of the cuneiform groove 138. Each side wall 121 has a location groove 124 having a "[" shape with an opening outward. The location grooves 124 correspond to the chips 145 of the third frame 14, the chips 116 of the second frame 11, and the chips 108 of the first frame 10.

The process of assembling the liquid crystal display 1 is as follows. Firstly, a backlight module is assembled. The two ends of each lamp are put into a rectangular housing groove of the two side fasten trellises 13 respectively. Then, the two side fasten trellises 13 are assembled on the bottom plate 143 of the third frame 14. The cuneiform grooves 138 are disposed corresponding to the rectangular openings 144. The plurality of optical films are assembled above the lamps and the side fasten trellises 13. The third frame 14 is housed into the second frame 11, such that the third side wall 111 and the fifth side wall 113 of the second frame 11 surround the first side wall 141 and the second side wall 142 of the third frame 14, respectively. The second clips 118 are disposed corresponding to the first clips 146 and the cuneiform grooves 138. Then, a liquid crystal display panel is assembled above the backlight module. The liquid crystal display panel and the backlight module are both housed in the first frame 10, such that the seventh side wall 101, the eighth side wall 102, the ninth side wall 103, and the tenth side wall 104 of the first frame 10 surround the outside of third side wall 111, the fourth side wall 112, the fifth side wall 113, and the sixth side wall 114 of the second frame 11. The rectangular openings of the third clip 100, the rectangular openings 144 of the third frame 14 and the rectangular openings 115 of the second frame 11 correspond to the cuneiform grooves 138. The chips 108 of the first frame 10 correspond to the chips 116 of the second frame 11 and the chips 145 of the third frame 14. The second gaps 109 of the first frame 10 correspond to the first gaps 117 of the second frame 11.

Referring to FIG. 3 to FIG. 6, when fastening the third frame 14, the side fasten trellises 13, the second frame 11, and the first frame 10, each tenon 12 is pushed into the corresponding first gap 117 and the corresponding second gap 109. The two corresponding chips 145 of the third frame 14, the two corresponding chips 116 of the second frame 11, and the two corresponding chips 108 of the first frame 10 all slip into the two location grooves 124 of the tenon 12. Because the protrusion 123 presses the corresponding flexible plate 105, the flexible plate 105 bends along the protrusion 123 and snaps into the corresponding cuneiform groove 138 of the corresponding side fasten trellis 13. The circular first fixing portion 1052 and the rectangular first fixing portion 1051 of the flexible plate 105 are pressed into the circular fixing portion 136 and the rectangular fixing portion 135 of the cuneiform groove 138, respectively.

The present liquid crystal display 1 utilizes the first clips 146 of the third frame 14, the second clips 118 of the second frame 11, the third clips 100 of the first frame 10, the cuneiform grooves 138 of the side fasten trellises 13, and the plurality of tenons 12. The location grooves 124 of the tenons 12 house the third clips 100, the second clips 118, and the first clips 146; and the protrusions 123 of the tenons 12 press into the cuneiform grooves 138 of the side fasten trellises 13. Thereby, the first frame 10, the second frame 11, the third frame 14, and the side fasten trellises 13 are assembled with each other and with the tenons 12 to form the liquid crystal display 1. There is no need for any screws to assemble the liquid crystal display 1. As described above, the liquid crystal display 1 can be assembled quickly, and can be disassembled conveniently.

Figure 7:
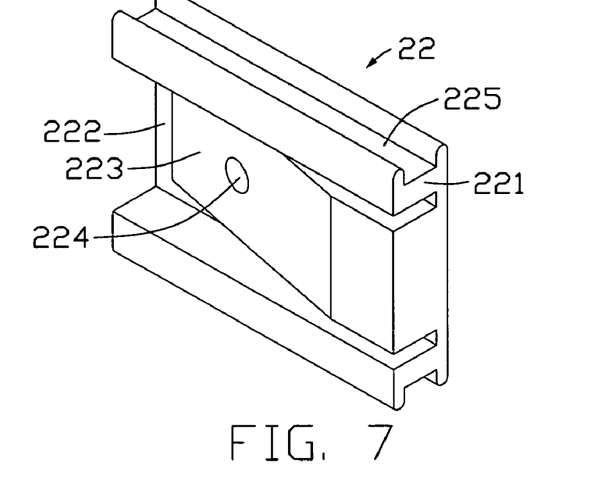
FIG. 7 shows an enlarged view of a tenon according to a second embodiment of the present disclosure.

Referring to FIG. 7, the structure of the tenon 22 is similar to the structure of the tenon 12. The main difference between the tenon 12 and the tenon 22 is as follows: the tenon 22 further includes a semicircular protrusion 224. The semicircular protrusion 224 is disposed on an incline plane of a protrusion 223.

Figure 8:
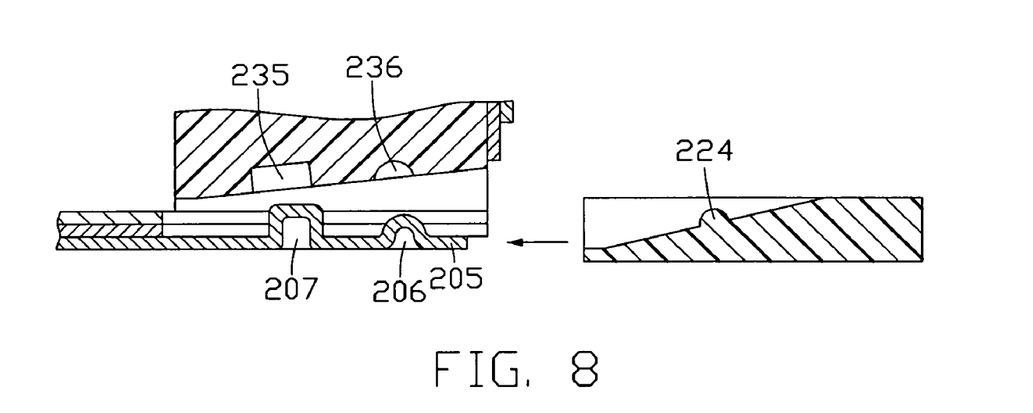
FIG. 8 shows a cross-sectional view of a to-be-assembled tenon of FIG. 7.
Figure 9:
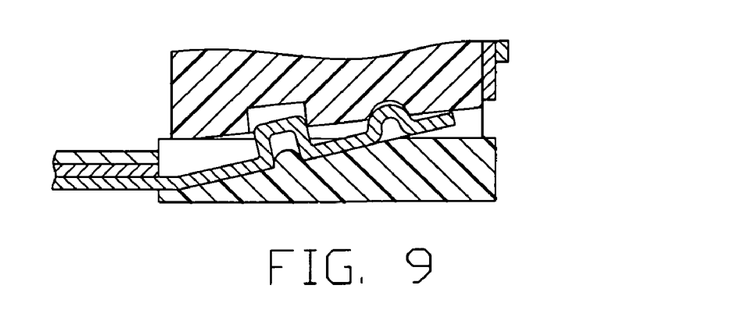
FIG. 9 shows a cross-sectional view of an assembled tenon of FIG. 7.

Referring to FIG. 8 and FIG. 9, when the tenon 22 is being assembled, the semicircular protrusion 224 works with a circular groove 206 to location and then the semicircular protrusion 224 snaps into a rectangular groove 207. The semicircular protrusion 224 blocks with the rectangular groove 207 to make the tenon 22 more fasten. The liquid crystal display in this embodiment is more reliable.

Figure 10:
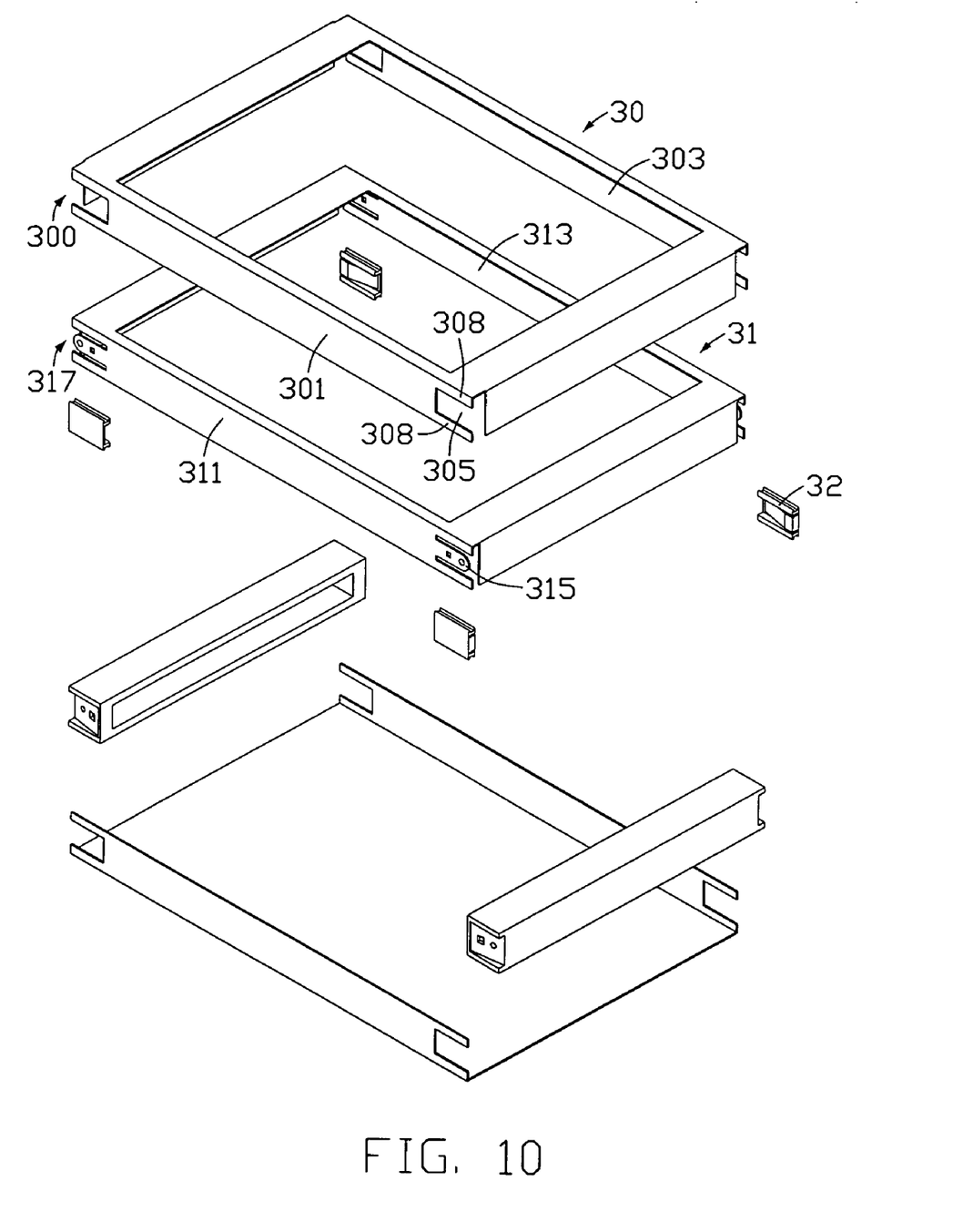
FIG. 10 shows an isometric view of a liquid crystal display according to a third embodiment of the present disclosure.

Referring to FIG. 10, compared with the liquid crystal display 1, the difference is as follows: four flexible plates 315 are disposed on the second frame 31. The structure of the flexible plate 315 is as the same as the flexible plate 105 of the liquid crystal display 1. The first frame 30 only has clips with a rectangular opening (not labeled) and two chips (not labeled). The assembly process is similar to that of the first embodiment.

Figure 11:
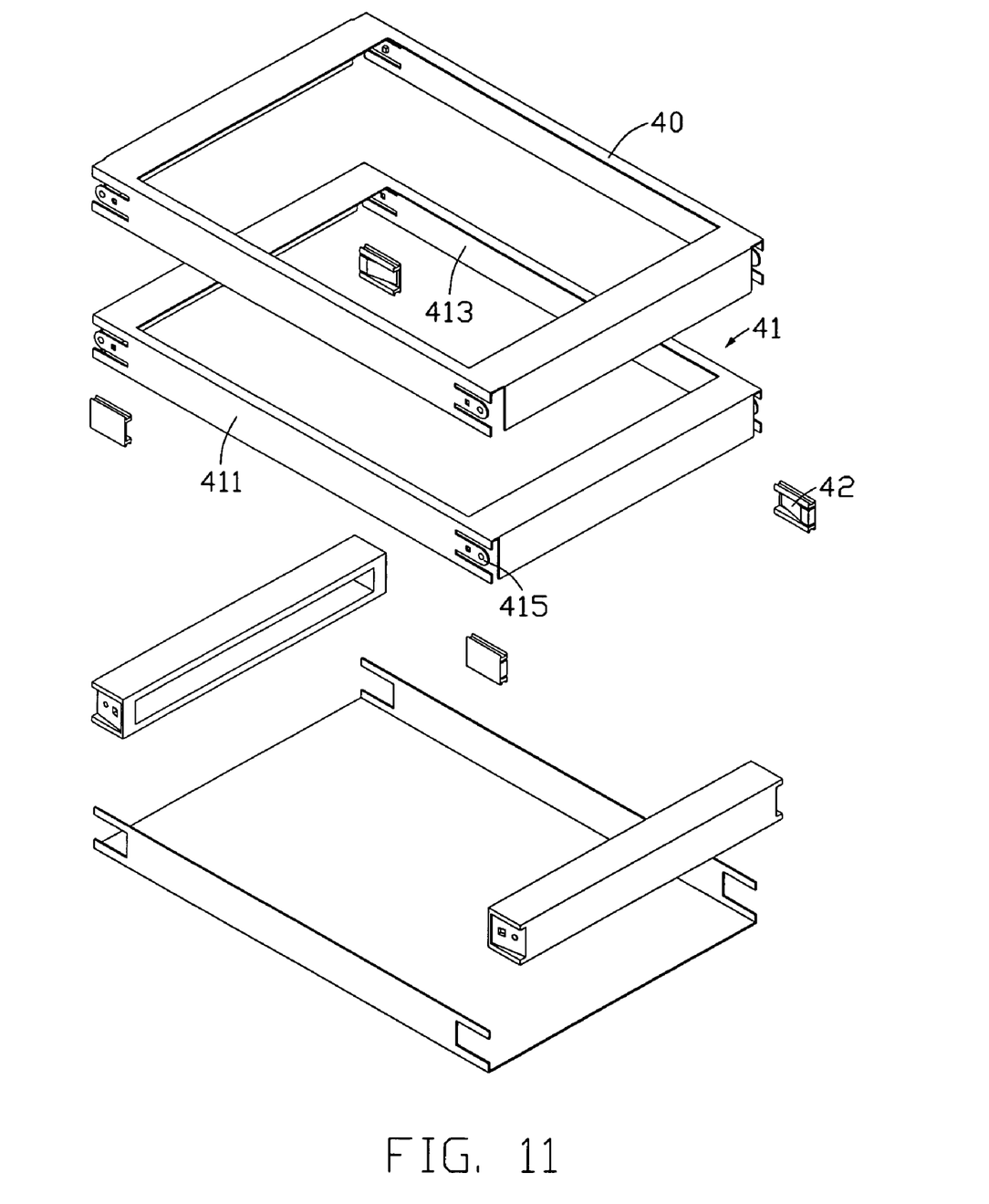
FIG. 11 shows an isometric view of a liquid crystal display according to a fourth embodiment of the present disclosure.

Referring to FIG. 11, compared with the liquid crystal display 1, the difference is as follows: four flexible plates 415 are disposed on the second frame 41. The structure of the flexible plate 415 is as the same as the flexible plate 105 of the liquid crystal display 1. When the tenon 42 is pushed to assemble the first frame 40 and the second frame 41, the flexible plate of the first frame 40 overlaps the flexible plate 415 of the second frame 41. The assembly process is similar to that of the first embodiment.

Figure 12:
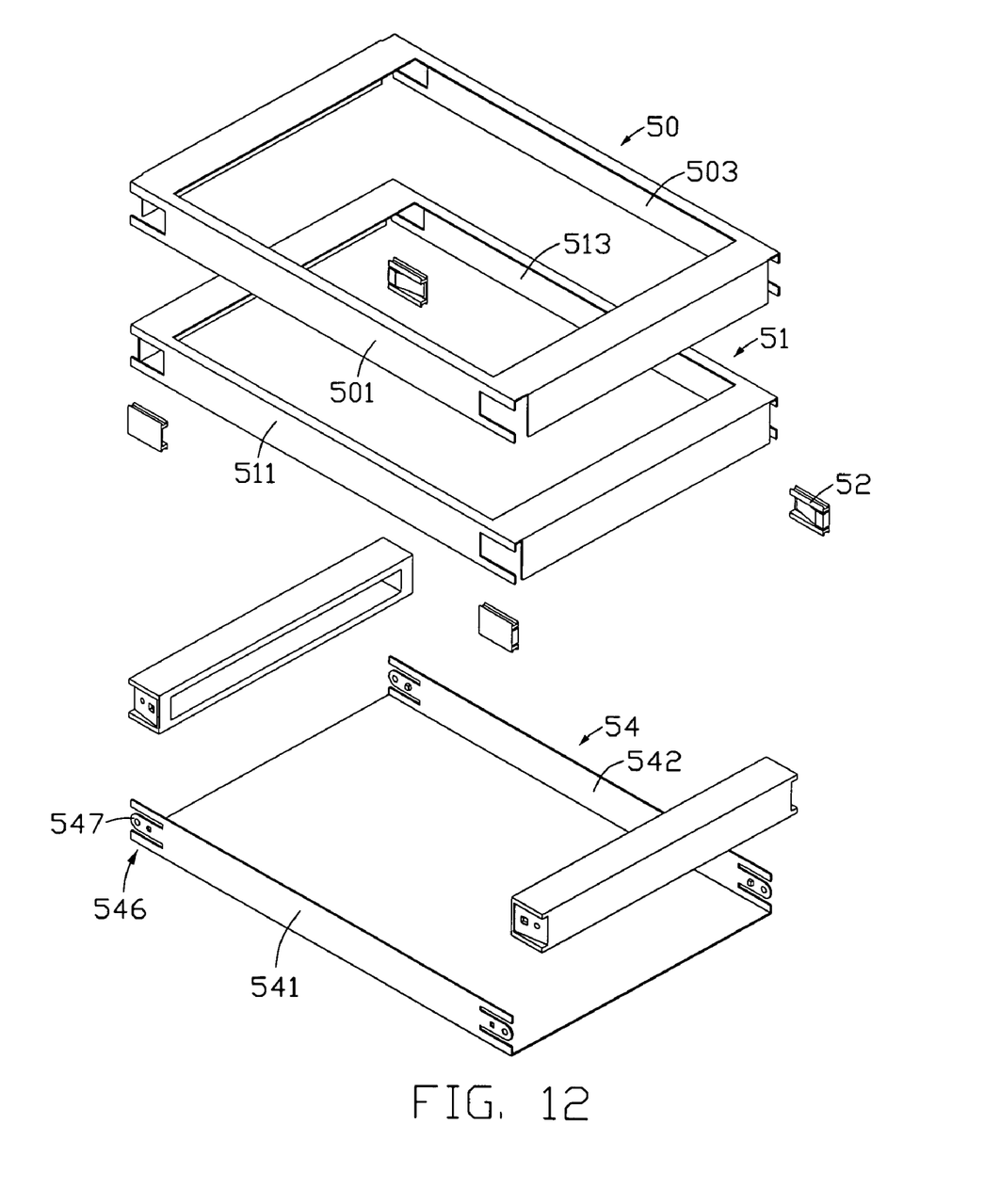
FIG. 12 shows an isometric view of a liquid crystal display according to a fifth embodiment of the present disclosure.

Referring to FIG. 12, compared with the liquid crystal display 1, the difference is as follows: four flexible plates 547 are disposed on the third frame 54. The structure of the flexible plate 547 is as the same as the flexible plate 105 of the liquid crystal display 1. There is no flexible plate disposed on the first frame 50 and the second frame 51. The assembly process is similar to that of the first embodiment.

It is believed that the present embodiments and their advantages will be understood from the foregoing description, and it will be apparent that various changes may be made thereto without departing from the spirit or scope of the disclosure or sacrificing all of its material advantages. For example: the shape of the rectangular second clip and the circular second clip can be changed to another shape. Just keep the second clip can be assembled well with the flexible plate.

What is claimed is:

1. A liquid crystal display, comprising:
   a plurality of frames with a plurality of clips;
   a plurality of side fasten trellises; and
   a plurality of tenons configured to fasten the frames and the side fasten trellises, wherein a plurality of fasten components are disposed on the clips of at least one frame, each side fasten trellis comprising a groove and a fasten portion, each tenon snapping into the groove of the side fasten trellis and jointing with the clips to assemble the frames and the side fasten trellises, each fasten component coordinating with the fasten portion to further fix the frames and the side fasten trellises.

2. The liquid crystal display of claim 1, wherein each clip comprises an opening and two chips.

3. The liquid crystal display of claim 2, wherein the fasten component is a flexible plate which extends from the opening of the clip, and is disposed between the two chips.

4. The liquid crystal display of claim 3, wherein the flexible plate comprises a rectangular first fixing portion and a circular first fixing portion outward.

5. The liquid crystal display of claim 4, wherein the rectangular first fixing portion is a protrusion.

6. The liquid crystal display of claim 5, wherein the frames comprise a first frame, a second frame, and a third frame.

7. The liquid crystal display of claim 6, wherein each clip disposed on the first frame comprises the fasten component.

8. The liquid crystal display of claim 7, wherein the fasten component further is disposed on each clip disposed on the second frame.

9. The liquid crystal display of claim 5, wherein each side fasten trellis comprises a cubic shape comprising a first side surface, a second side surface, a top surface, and a bottom surface, the first side surface and the second side surface having the groove and being disposed between the top surface and the bottom surface.

10. The liquid crystal display of claim 9, wherein the groove is a cuneiform groove, and the depth of the cuneiform groove decreases along a concaving direction of the opening.

11. The liquid crystal display of claim 10, wherein each cuneiform groove is disposed with the fasten portion, the fasten portion comprising a rectangular second fixing portion and a circular second fixing portion on a bottom surface of the cuneiform groove in turn.

12. The liquid crystal display of claim 11, wherein the shape and the size of the rectangular second fixing portion and the circular second fixing portion respectively correspond to that of the rectangular first fixing portion and the circular first fixing portion.

13. The liquid crystal display of claim 6, wherein each clip disposed on the second frame comprises the fasten component.

14. The liquid crystal display of claim 10, wherein each tenon comprises a base, two side walls extending vertically from two edges of the base respectively, and a protrusion, the two side walls being parallel to each other and having a same structure, the protrusion being disposed on the base between the two side walls, and the protrusion having a trapeziform shape.

15. The liquid crystal display of claim 14, wherein a slant angle of the protrusion corresponds to that of the cuneiform groove.

16. The liquid crystal display of claim 15, wherein each side wall has a location groove having a "[" shape.

17. The liquid crystal display of claim 16, wherein the two location grooves are disposed back to back and correspond to the chips of the third frame, the chips of the second frame, and the chips of the first frame.

18. A liquid crystal display, comprising:
    a plurality of frames with a plurality of clips;
    a plurality of side fasten trellises; and a plurality of tenons configured to assemble the frames and the side fasten trellises, each clip comprising an opening and two chips, each side fasten trellis having a groove, each tenon snapping into a corresponding groove and conjoining with the corresponding chips of the frames to assemble the frames and the side fasten trellises.

19. The liquid crystal display of claim 18, wherein the groove comprises a slant bottom surface, the depth of the groove decreases along a concaving direction of the opening, and each tenon comprises a base, a protrusion disposed on the base and defining a slant surface relative to the base, and two side walls extending vertically from two edges of the base respectively, a slant direction of the slant surface being opposite to that of the slant bottom surface of the groove, and each side wall having a location groove disposed on an outside surface of the side wall and corresponding to the chips of the respective clips of the respective frames.

20. The liquid crystal display of claim 19, wherein a fasten portion is disposed on the slant bottom surface of the groove, and a fasten component is disposed on the corresponding clip of at least one frame, the fasten component corresponding to the fasten portion.

* * * * *